(12) United States Patent
Stöhr et al.

(10) Patent No.: US 11,371,607 B2
(45) Date of Patent: Jun. 28, 2022

(54) LOCKING DEVICE OF A PARKING BRAKE AND A PARKING BRAKE

(71) Applicant: IMS GEAR SE & Co. KGaA, Donaueschingen (DE)

(72) Inventors: Johannes Stöhr, Villingen-Schwenningen (DE); Fabian Gruler, Aixheim (DE); Wilfried Synovzik, Hüfingen (DE)

(73) Assignee: IMS GEAR SE & CO. KGAA, Donaueschingen (DE)

( * ) Notice: Subject to any disclaimer, the term of this patent is extended or adjusted under 35 U.S.C. 154(b) by 0 days.

(21) Appl. No.: 17/165,624

(22) Filed: Feb. 2, 2021

(65) Prior Publication Data

US 2021/0239211 A1  Aug. 5, 2021

(30) Foreign Application Priority Data

Feb. 5, 2020 (EP) .................................... 20155686

(51) Int. Cl.
*F16H 63/34* (2006.01)
*F16H 63/48* (2006.01)

(52) U.S. Cl.
CPC ..... *F16H 63/3425* (2013.01); *F16H 63/3466* (2013.01); *F16H 63/48* (2013.01)

(58) Field of Classification Search
CPC .. F16H 63/3425; F16H 63/3466; F16H 63/48; B60T 1/005; F16D 67/00; F16D 2129/10; F16D 2066/001; F16D 2121/24
See application file for complete search history.

(56) References Cited

U.S. PATENT DOCUMENTS 1,450,409 A * 4/1923 Cirac ................... B60T 7/122
                                                      188/30
5,605,211 A * 2/1997 Hall, III ............... B60T 1/005
                                                      188/31

(Continued)

FOREIGN PATENT DOCUMENTS

| CN | 105840820   | * | 8/2016  |
| DE | 102018003752 | * | 11/2019 |
| KR | 10-1371906  | * | 3/2014  |

OTHER PUBLICATIONS

Machine language translation of KR10-1371906.*

(Continued)

*Primary Examiner* — Mark A Manley
(74) *Attorney, Agent, or Firm* — Nath, Goldberg & Meyer; Jerald L. Meyer; Stanley N. Protigal (57) ABSTRACT

The present invention relates to a locking device (1) of a parking brake, comprising a ratchet wheel (10) movable about an axis of rotation (X), at least two pawls (20) which can engage in the ratchet wheel (10) to fix it, an actuating device (50) and a coupling element (30), wherein the coupling element (30) couples the at least two pawls (20) to the actuating device (50), and wherein the coupling element (30) is movable by the actuating device (50) into a first position (A), in which the at least two pawls (20) allow rotation of the ratchet wheel (10) in a first direction of rotation and a second direction of rotation, and a second position (B), in which the at least two pawls (20) can engage in the ratchet wheel (10) and allow rotation in only the first direction of rotation. The present invention also relates to a parking brake with a locking device (1).

21 Claims, 4 Drawing Sheets

(56) References Cited

U.S. PATENT DOCUMENTS

| | | | |
|---|---|---|---|
| 2005/0258683 A1 | 11/2005 | Yamaguchi | |
| 2010/0212461 A1 | 8/2010 | Burt | |
| 2015/0025750 A1* | 1/2015 | Weslati | B60W 10/11 |
| | | | 701/48 |
| 2018/0009420 A1* | 1/2018 | Tsukamoto | B60T 7/12 |
| 2020/0116258 A1* | 4/2020 | Cyren | F16H 1/16 |

OTHER PUBLICATIONS

Machine language translation of CN 105840820.*
Machine language translation of DE102018003752.*
Extended European Search Report dated Sep. 1, 2020, for corresponding application EP 20155686.7.

* cited by examiner

LOCKING DEVICE OF A PARKING BRAKE AND A PARKING BRAKE

FIELD

The present invention relates to a locking device of a parking brake having the features of at least two pawls that can engage a ratchet wheel, and the coupling element that couples the pawl to an actuating device, and to a parking brake having an electric motor for actuation.

BACKGROUND

Parking brakes are known from prior art in different configurations. The parking brakes known from prior art can be divided into several categories, for example dry parking brakes, hydraulic parking brakes or hand brakes. A parking brake is applied whenever a motor vehicle is to remain in one position for a long period of time. While a hand brake comprises a mechanically actuated lever which is connected to the brake of a wheel or an axle by coupling means, dry parking brakes or hydraulic parking brakes are mainly controlled electrically. Hydraulic parking brakes use a hydraulic cylinder to lock the vehicle, the hydraulic pressure for actuating the hydraulic parking brake usually being made available by the oil circuit of the motor vehicle. Dry parking brakes can be operated purely electrically and comprise an electric motor, by means of which the brake on the particular tire or the particular axle can be applied and released again.

In order to ensure that the parking brakes brake the motor vehicle sufficiently at all times, dry parking brakes in particular must be tightened when the vehicle is stationary, in order to provide a sufficiently high braking force even when the components involved have cooled down so that the motor vehicle remains in its position.

Such parking brakes have proven themselves in the past, but with dry parking brakes it must be ensured with considerable effort that they do not open unintentionally. For this purpose, inter alia, locking devices are used which, on the one hand, have proven to be unreliable and error-prone and, on the other hand, have high response times, which in particular delay the opening of the parking brake to continue driving.

SUMMARY

This is where the present invention starts.

The present invention addresses the problem of proposing an improved locking device for a parking brake and an improved parking brake, which expediently eliminates the disadvantages of the parking brakes known from prior art and enables the braking force to be reliably maintained. Both the locking device and the parking brake should have a small and compact design, be able to be fully electrically actuated and have a fast response time.

These problems are solved by a locking device of a parking brake with at least two pawls that can engage a ratchet wheel, and the coupling element that couples the pawls to an actuating device, and to a parking brake having an electric motor for actuation.

The inventive locking device of a parking brake having a ratchet wheel movable about an axis of rotation and at least two pawls, the pawls being able to engage the ratchet wheel for one-sided locking or blocking of the ratchet wheel. In addition, the locking device according to the invention has an actuating device and a coupling element, the coupling element coupling the at least two pawls to the actuating device. Furthermore, it is provided that the coupling element can be moved by the actuating device into a first position, in which the at least two pawls allow rotation of the ratchet wheel in a first direction of rotation and a second direction of rotation, and into a second position, in which the at least two pawls can engage in the ratchet wheel and allow rotation of the ratchet wheel in only the first direction of rotation.

The invention is based on the idea that the pawls cannot engage the ratchet wheel in the first position of the coupling element and are consequently pushed out of the ratchet wheel. The pawls can, however, be transferred from the first position to the second position to close the parking brake by advancing the coupling element. In the second position of the coupling element, only rotation of the ratchet wheel about the axis of rotation is possible for closing or tightening the parking brake. The locking of the ratchet wheel can be canceled again by a renewed advancement of the coupling element into the first position.

In connection with this invention, the ratchet wheel is a pinion with toothing which, for example, comprises sawtooth-shaped teeth. The ratchet wheel can have a plurality of teeth, wherein the teeth can preferably be arranged around the circumference about the axis of rotation at a constant angle, the so-called pitch angle. The number of teeth on the ratchet wheel can be an even or an odd number.

Furthermore, the toothing can be designed such that the at least two pawls are arranged at a different pitch angle ti relative to one tooth of the toothing of the ratchet wheel. For example, if two pawls are provided, one of the two pawls can be offset by ½ T. If a number n of pawls are provided, the pawls can each be arranged offset by 1/n τ. With three pawls this means an offset of ⅓ τ and ⅔ τ and with four pawls an offset of ¼ τ, ½ τ, ¾ τ. Multiple pawls can also be arranged redundantly and at the same time engage in the ratchet wheel or be pushed out. As a result of this arrangement, when the ratchet wheel rotates in the first direction of rotation, at least one of the at least two pawls is always engaged, as a result of which only freewheeling in the first direction of rotation of the ratchet wheel is enabled. The tooth shape should make it easier to re-tension the parking brake. Each pawl has a mating profile, which comprises at least one ratchet tooth, the shape of which is adapted to the toothing of the ratchet wheel. The shape of the ratchet tooth is chosen such that the ratchet tooth can be disengaged in the first direction of rotation of the ratchet wheel by a tooth back, and is drawn into a tooth gap between two teeth of the ratchet wheel in the second direction of rotation and blocks rotation of the ratchet wheel. For this purpose, each tooth has a correspondingly shaped tooth face.

According to a further embodiment of the present invention, the at least two pawls are arranged around the axis of rotation and relative to the ratchet wheel in such a way that, in the second position of the coupling element, the at least two pawls alternately engage the ratchet wheel when the ratchet wheel rotates in the first direction of rotation and are disengaged. The alternating engagement of the at least two pawls in the ratchet wheel ensures at all times that the ratchet wheel is blocked in the second direction of rotation. In particular, it has proven to be advantageous if the at least two pawls are arranged at different pitch angles relative to the toothing of the ratchet wheel. For example, the pawls are offset by half a tooth pitch relative to any tooth of the ratchet wheel, according to which one of the at least two pawls is always in engagement between two teeth of the ratchet wheel, while the other of the at least two pawls is disengaged. In the event that more than two pawls are provided, several pawls can either engage redundantly in the ratchet wheel at the same time and/or be offset over a correspondingly smaller portion of the pitch angle. In the event that three pawls are provided, these can be offset by a third of the pitch angle with respect to the toothing of the ratchet wheel.

An advantageous embodiment of the present invention provides that the at least two pawls are arranged distributed in the circumference around the axis of rotation. In particular, it has proven to be advantageous if the at least two pawls are arranged circumferentially symmetrically distributed around the axis of rotation, and the number i of teeth of the ratchet wheel is an odd number. In this way it can be ensured that at every angular position of the ratchet wheel (in the second position of the coupling element) at least one of the at least two pawls is in engagement between two teeth of the ratchet wheel.

According to a further embodiment of the present invention, the at least two pawls can each be pivoted about a pivot axis, each pivot axis preferably being arranged parallel to and at a distance from the axis of rotation of the ratchet wheel.

It has also proven to be advantageous if at least one preload is provided, by means of which at least one of the at least two pawls is pressed against the ratchet wheel. The preload can be brought about by a return spring, whereby at least one of the at least two pawls preloads at least in the second position of the coupling element in such a way that the at least one of the at least two pawls can be pushed out against a spring force. An unintentional release or an unintentional pushing out of the at least one of the at least two pawls from the engagement can thus be prevented.

According to a further development of one of the configurations described above, at least one of the at least two pawls and the coupling element can be coupled via a guide lug and a link guide, the guide lug engaging the link guide. The link guide is preferably formed on the coupling element and at least one of the at least two pawls has a guide lug. The link guide can be designed in such a way that in the first position of the coupling element the at least two pawls are forced out of the ratchet wheel and thus rotation of the ratchet wheel is possible both in the first direction of rotation and in the second direction of rotation. In the second position of the coupling element, the at least two pawls can engage the ratchet wheel. When the ratchet wheel rotates in the first direction of rotation, one of the at least two pawls is disengaged in a ratchet-like manner, preferably against the spring force of the preload, and can then engage in a tooth gap following in the direction of rotation.

A preferred embodiment of the present invention provides that the link guide is L-shaped with a first section and a second section, and that the first section is arranged in a direction of rotation around the axis of rotation and forcibly stipulates a relative position of the guide lug in a radial direction—based on the axis of rotation. The second section can be arranged in a radial direction—based on the axis of rotation—and allows free relative movement of the guide lug approximately in the radial direction.

In addition, it has proven to be advantageous if the coupling element is arranged to be rotatable about the axis of rotation. The coupling element is preferably arranged coaxially with the ratchet wheel.

Furthermore, it has proven to be advantageous if the coupling element is ring-shaped. The coupling element can thus couple the pawls to the actuating unit in the manner of a synchronizer ring. In particular, it is advantageous if the coupling element forms an open or closed ring, through which the pawls distributed over the circumference are connected and through which the pawls can be synchronized.

Another embodiment of the locking device according to the present invention provides that the actuating device is a linear drive. The actuating device can be connected to the coupling element via a corresponding connecting means, e.g., a lever, whereby the linear movement of the actuating device can be converted into a movement, preferably a rotary movement, of the coupling element.

In particular, it has proven to be advantageous if the actuating device comprises a lifting magnet, the lifting magnet preferably having two stable end positions and the lifting magnet being connected to the coupling element in such a way that the lifting magnet is held in a stable end position both in the first position as well as in the second position of the coupling element. The lifting magnet enables the locking device to be unlocked and locked particularly quickly, as a result of which the locking device or the parking brake can be opened without any appreciable delay. Such a parking brake accordingly has a particularly short response time.

In addition, the coupling element is permanent-magnetically held in the first position and in the second position by the bistable lifting magnet and a current is only required to open or unlock the locking device. In the currentless and voltage-free state, the locking device remains in the open or locked state. In the event of a fault, e.g., in the power supply, the locking device cannot be opened or closed unintentionally.

It can also be advantageous if a position securing device is provided, which keeps the coupling element secured both in the first position and in the second position. The position securing device is intended to prevent an unintentional change in the position of the coupling element and can, for example, comprise a spring-held locking bracket, which is pushed out from a form fit and releases the coupling element when a predefined advancement force or an advancement torque is exceeded on the coupling element. It can be advantageous if the position securing device secures the coupling element in at least one of the two positions, preferably in the first position when the motor vehicle is being driven.

According to a preferred development of the present invention, at least one sensor can be provided, which can detect whether the ratchet wheel is released or not. In particular, it is preferred if the at least one sensor detects the position of the actuating device and/or the position of the coupling element. Furthermore, it is advantageous if the at least one sensor detects whether at least one of the at least two pawls is engaging or releasing the ratchet wheel. One embodiment can provide that the at least two pawls are monitored independently of one another by the at least one sensor in order to be able to resolve, for example when the ratchet wheel rotates in the first direction, that a rotation in the second direction is blocked and that always at least one of the at least two ratchet wheels is in engagement with the ratchet wheel.

The at least one sensor can furthermore comprise an inductive, capacitive, optical, and magnetic sensor system. In particular, it is preferred if the magnetic sensor system includes one or more Hall sensors. Both the coupling element and at least one of the at least two pawls can have corresponding means by which the sensor system can detect the states. For example, the coupling element and/or at least one of the at least two pawls can have a reflector, magnet, or the like, by means of which the sensor system can detect a change in the position of the corresponding components. In a preferred embodiment of the present invention, both the position of the coupling element and the position of the pawls can be detected, with a Hall sensor being provided for each pawl and for the coupling element, and the at least two pawls and the coupling element having a permanent magnet.

A further advantageous embodiment of the present invention provides that a housing is provided and that the at least two pawls and/or the coupling element are held in a supported manner on the housing. In particular, it is preferred if the housing is a hybrid component made of two different materials, the housing preferably consisting of a stamped first component, preferably made of metal, and a second component, preferably made of plastic, which can result in cost savings and weight reduction. The housing can integrate the brake actuator, after which a compact brake unit can be provided.

According to a further advantageous embodiment of the present invention, the at least one sensor and/or a controller of the actuating device is/are arranged on the housing side. In particular, it is preferred if the locking device has an interface through which the supply of electrical energy and status feedback from the locking device can take place. This results in a self-contained unit and the locking device can be assembled modularly and pre-assembled in a parking brake.

Another aspect of the present invention relates to a preferably exclusively electric parking brake, having an electric motor which actuates the one brake and a locking device according to the invention.

A further development of the parking brake provides that a temperature detection of the brake is provided. As soon as the motor vehicle is parked and the brake cools down, the electric motor can tighten the brake and compensate for thermal expansion.

BRIEF DESCRIPTION OF THE DRAWINGS

An exemplary embodiment of a locking device according to the invention for a parking brake is described in detail below with reference to the accompanying drawings. In the drawings.

DETAILED DESCRIPTION

In the following, identical or functionally identical components in the one exemplary embodiment are identified by the same reference symbols. For the sake of clarity, not all parts that are the same or functionally the same are provided with a reference number in the individual figures.

Figure 1:
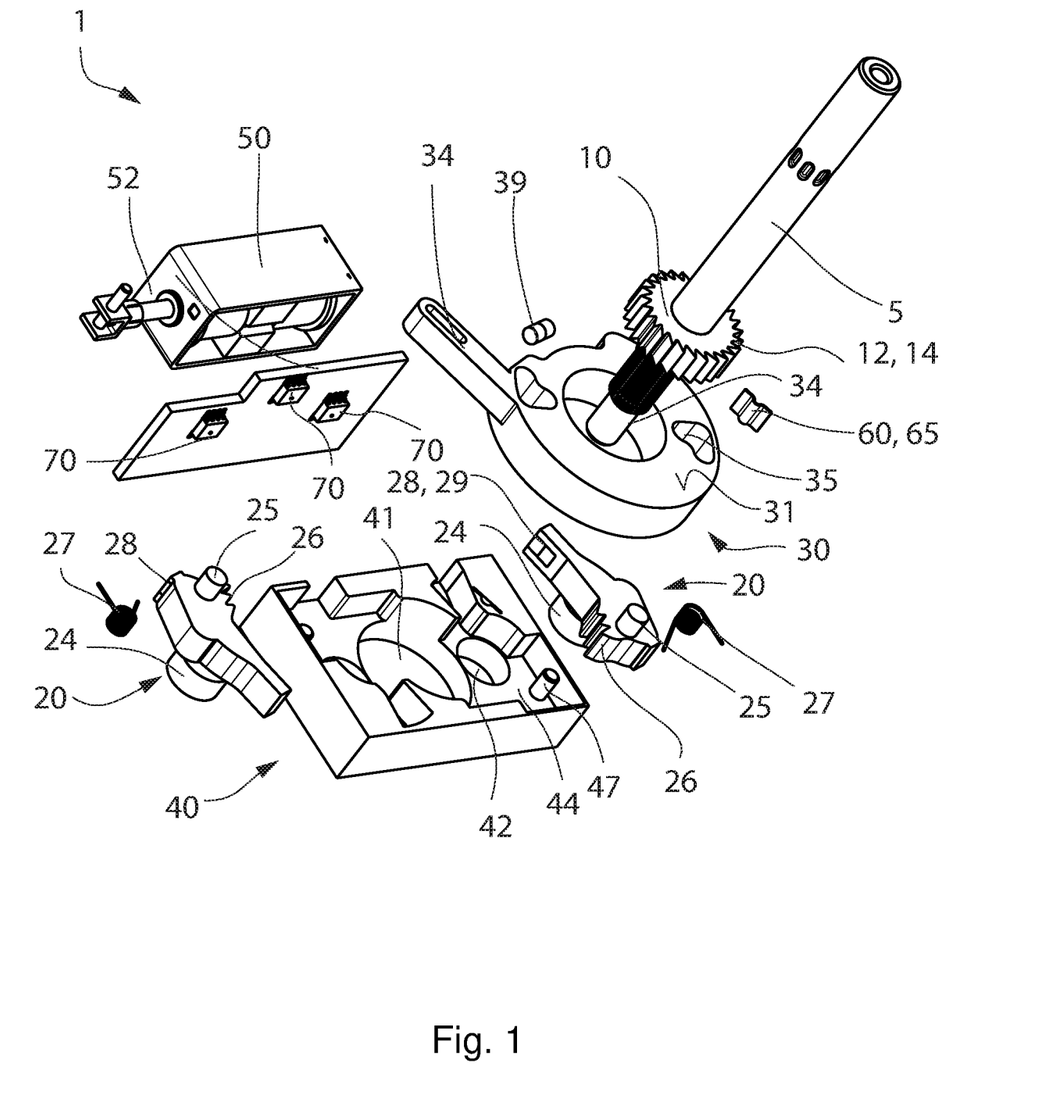
FIG. 1: a greatly simplified and schematic exploded view of a locking device according to the invention with a ratchet wheel, two pawls, a coupling element, and an actuating device.

The greatly simplified exploded view according to FIG. 1 shows a locking device 1 according to the invention. The locking device 1 is part of a (not fully illustrated) parking brake of a motor vehicle, which is set up to apply or release a brake of a wheel or an axle.

Figure 2:
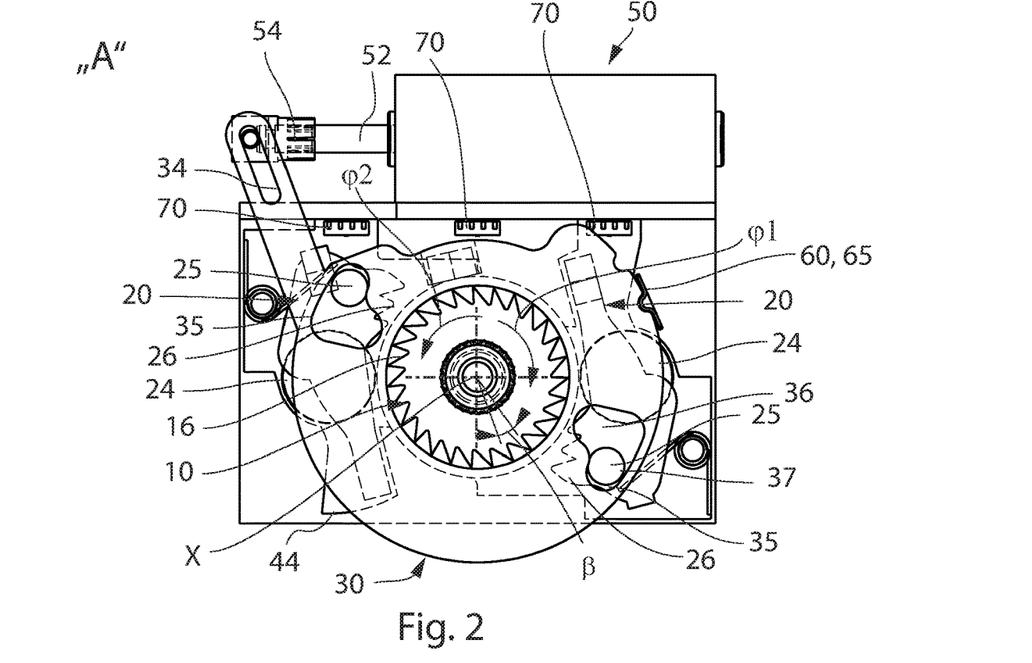
FIG. 2 shows a greatly simplified and partially transparent illustration of the locking device according to FIG. 1 in a first position, the pawls allowing the ratchet wheel to rotate in a first direction of rotation and a second direction of rotation.
Figure 3:
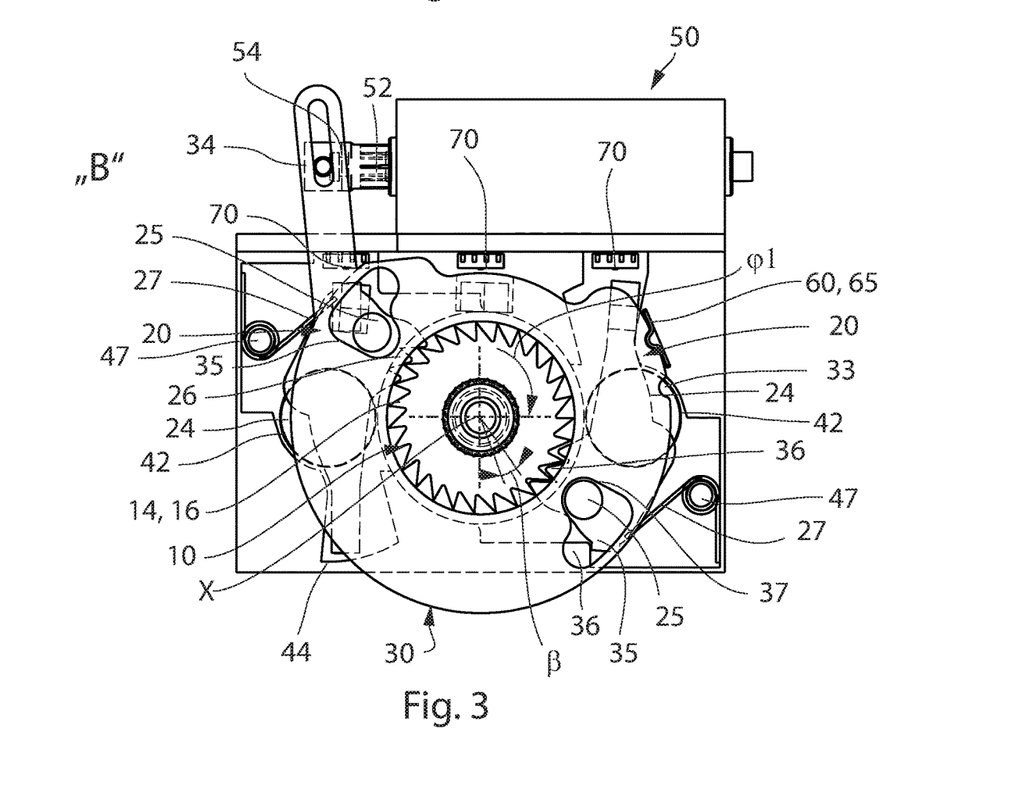
FIG. 3 shows a greatly simplified and partially transparent illustration of the locking device according to FIG. 2 in a second position, the pawls allowing the ratchet wheel to rotate exclusively in the first direction of rotation.

The electric parking brake can have an electric motor (not shown) that is connected to the brake via a drive shaft 5, the drive shaft 5 being able to be rotated about an axis of rotation X in a first direction of rotation $\varphi 1$ to apply the brake and in a second direction of rotation $\varphi 2$ to release the brake. Each direction of rotation $\varphi 1$ and $\varphi 2$ is indicated in FIGS. 2 and 3 by means of an arrow line.

The locking device 1 comprises a ratchet wheel 10 that is movable about the axis of rotation X and at least two pawls 20, which can engage the ratchet wheel 10 to fix or lock the ratchet wheel 10. The locking device 1 furthermore comprises a coupling element 30 and an actuating device 50, the coupling element 30 coupling the at least two pawls 20 to the actuating device 50.

The at least two pawls 20 and the coupling element 30 can be arranged in a housing 40, the housing 40 having a through opening 41 through which the drive shaft 5 is guided coaxially.

The ratchet wheel 10 is equipped in the manner of a pinion with toothing 12 comprising a number i of teeth 14, the number i in the exemplary embodiment shown being an odd number, i=27. The teeth 14 are sawtooth-shaped, the teeth 14 preferably being arranged in the direction of rotation around the axis of rotation X at a constant angle, the so-called pitch angle T. Each tooth 14 has a tooth face and a tooth back, which meet in a tooth tip. The so-called tooth gap is formed between two adjacent tooth tips. The tooth back points in the first direction of rotation $\varphi 1$ and the tooth face in the second direction of rotation $\varphi 2$, which means that the toothing 12 can be referred to as having a "strong on impact" toothing type in analogy to a saw tooth, and the cutting angle is less than 90°. In other words, the tooth face forms an undercut.

The ratchet wheel 10 is coupled to the drive shaft 5 for conjoint rotation.

In the present case, two preferably structurally identical pawls 20 are arranged around the ratchet wheel 10 or around the axis of rotation X, each of which pawls can pivot about a pivot axis X2. Each pivot axis X2 is preferably arranged parallel to and at a distance from the axis of rotation X.

Figure 5A:
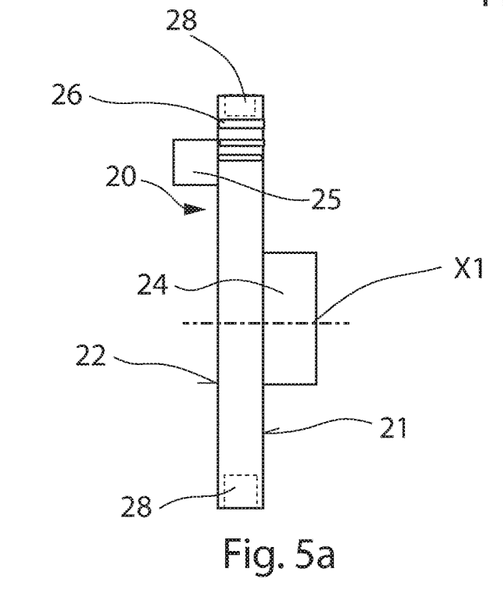
FIG. 5*a* is a plan view of one of the at least two pawls.
Figure 5B:
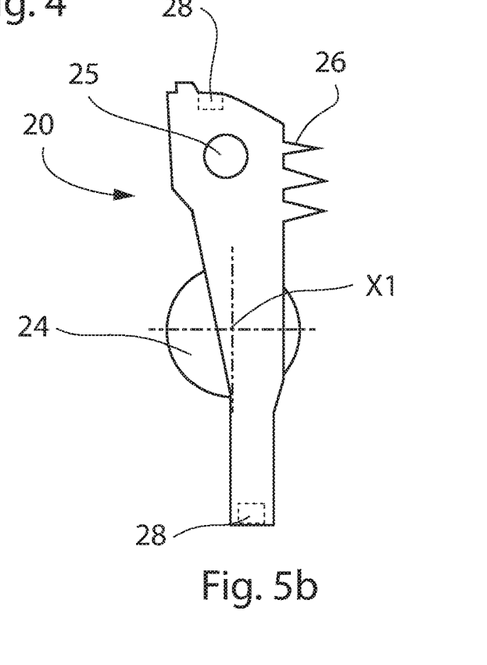
FIG. 5*b* is a side view of the pawl according to FIG. 5*a*.

The pawl 20, which is shown in detail in FIGS. 5*a* and 5*b*, has a first side 21 and a second side 22, and can be made of a metallic material, in particular in a screen printing process. On the first side 21 a bearing pin 24 protrudes from the pawl 20 and on the second side 22 a guide lug 25, wherein both the bearing pin 24 and the guide lug 25 can be cylindrical. The diameter of the bearing pin 24 is a multiple of the diameter of the guide lug 25.

As will be described in detail below, each pawl 20 is rotatably supported on the housing 40 about the pivot axis X2, the pawl 20 being rocker-shaped with a first end region and a second end region, which are arranged radially diametrically from the pivot axis X2. In the first end region, the previously mentioned guide lug 25 is arranged on the second side 22 as well as one or more ratchet teeth 26. The ratchet teeth 26 protrude in a direction of rotation about the pivot axis X2 and are adapted to the shape of the teeth 14 of the toothing 12 of the ratchet wheel 10.

Both in the first end region and in the second end region, pockets 28 can be formed—shown in FIGS. 5a and 5b with dotted lines—which can be designed to accommodate, for example, a sensor system or magnet 39, which will be described in detail later.

Figure 4:
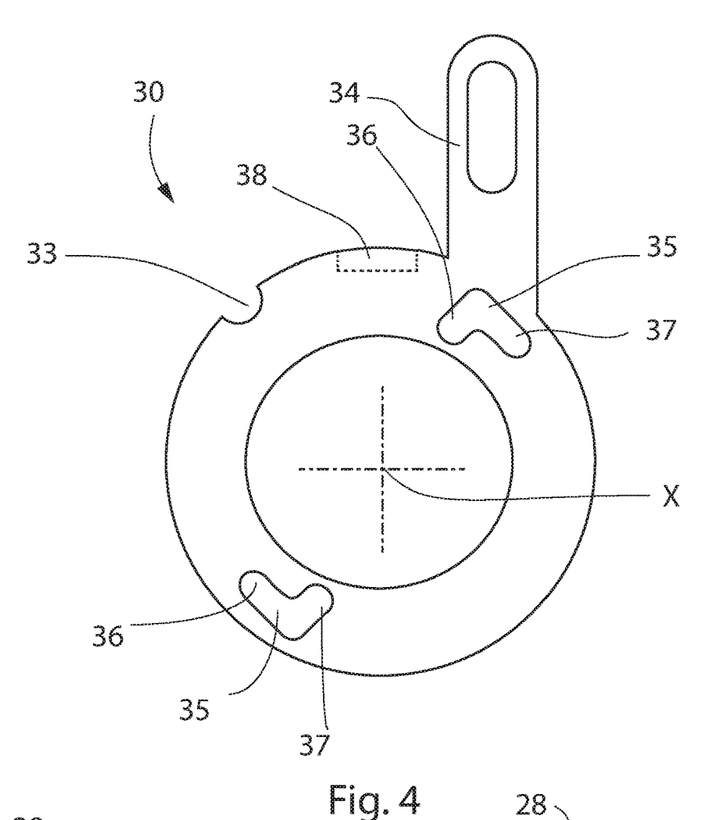
FIG. 4 is a simplified and schematic plan view of the coupling element.

The coupling element 30, shown in detail in FIG. 4, has a substantially annular section in the manner of a synchronizer ring. L-shaped link guides 35 with a first section 36 and a second section 37 are arranged in the annular section on diametrically arranged sides. The link guide 35 can be incorporated or molded into the coupling element 30 as a groove, the link guide 35 being adapted to the guide lug 25 of the relevant pawl 20 such that the guide lug 25 can be positively guided in the link guide 35.

A connecting means 34 protrudes in the form of a rod from the annular section of the coupling element 30. In a region of a free end of the connecting means 34, an elongated hole breaking through the connecting means 34 can be formed.

Furthermore, the coupling element 30 can have a pocket 28 which can be designed to accommodate a sensor system, which will be described in detail later. The coupling element 30 can also have a notch 33 into which a locking bracket 65 of a position securing device 60, which will be described in detail later, can engage in the radial direction with respect to the axis of rotation X.

Figure 6A:
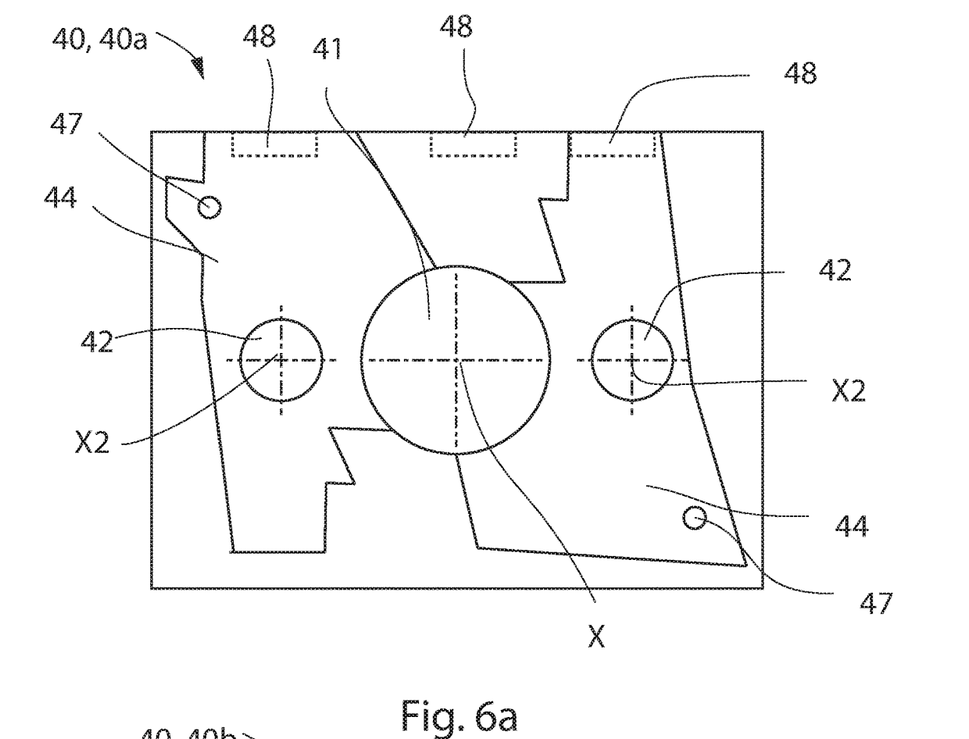
FIG. 6*a* shows a simplified plan view of a first housing half of the housing.
Figure 6B:
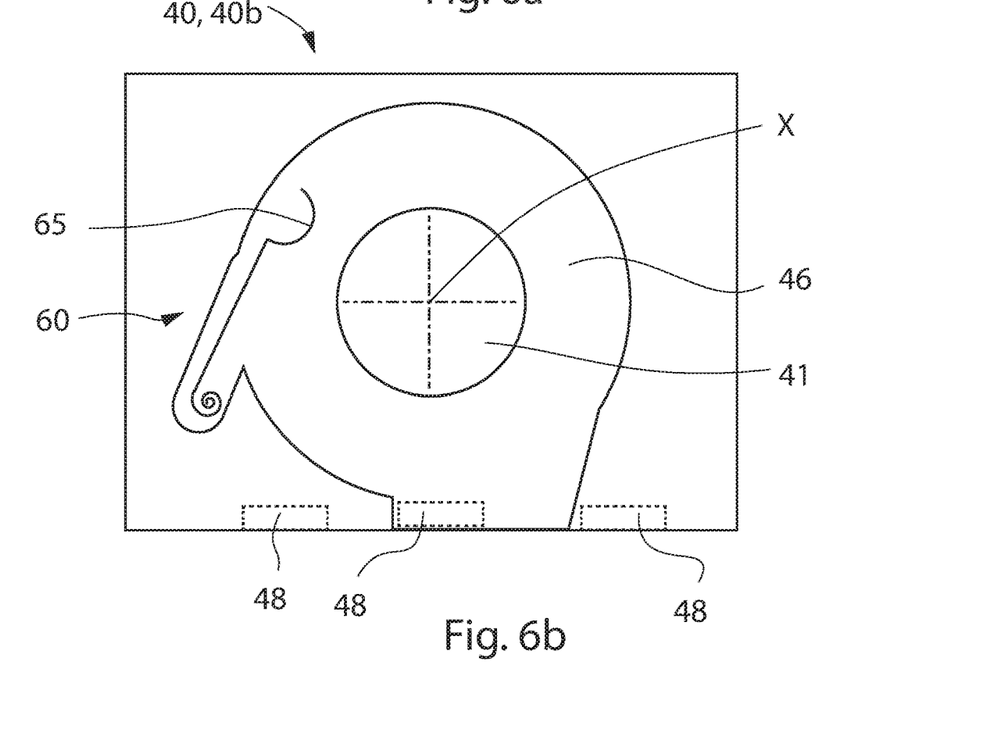
FIG. 6*b* shows a simplified plan view of a second housing half of the housing.

The housing 40 can be produced in one piece or from multiple housing halves 40a, 40b as a hybrid component, a first housing half 40a being shown in FIG. 6A and the second housing half 40b in FIG. 6B. Both housing halves 40a, 40b have in common that they have a through opening 41, and each have at least one recess 44, 46 on an inner side. In the first housing half 40a according to FIG. 6a, bearing pin receptacles 42, which are adapted to the size of the bearing pins 24 of the pawls 20, are arranged on diametrical sides around the axis of rotation X2. Furthermore, it can be seen from FIG. 6A that the first recess 44 is formed around the bearing pin receptacle 42, the first recess 44 being configured to receive the pawls 20. The recess 44 can be dimensioned such that the guide lug 25 of the relevant pawl 20 protrudes. The shape and size of the first recess 44 take into account that the pawl 20 can be pivoted about the pivot axis X2 formed by the bearing pin receptacle 42 and the bearing pin 24. Furthermore, spring mounts 47 can be provided, to each of which a return spring 27 can be attached.

The second housing half 40b according to FIG. 6b has the second recess 46, which is formed approximately coaxially to the through opening 41 and is adapted to the annular section of the coupling element 30. In the second recess 46, the ring-shaped section of the coupling element 30 can be mounted coaxially to the axis of rotation X, whereby the coupling element 30 is held in the housing 40 so as to be rotatable about the axis of rotation X.

The housing 40 can have one or more sensor pockets 48 on one side, which can accommodate a sensor 70. The sensor pockets 48 can be arranged both in the first housing half 40a and/or in the second housing half 40b and are indicated with dotted lines in FIGS. 6a and 6b.

Furthermore, the position securing device 60 is shown in FIG. 6b, which comprises a spring-loaded locking bracket 65 which is set up to grip into the notch 33 of the coupling element 30 in the first position A and/or in the second position B and to lock it.

The actuating device 50 can be any drive by means of which the coupling element 30 can be adjusted about the axis of rotation X from a first position A to a second position B. In the illustrated embodiment, the actuating device 50 comprises a lifting magnet with two stable end positions, which is characterized in that a plunger 52 can be permanent-magnetically held by the actuating device 50 in a first end position, shown in FIG. 3, in a second end position, shown in FIG. 2. At a free end, the plunger 52 has connecting means 54, by means of which an advancing movement can be transmitted to the coupling element 30. When the actuating device 50 is energized, the permanent-magnetic holding force is released in the relevant end position and the plunger is moved into the other end position. The lifting magnet enables a particularly rapid advancement of the actuating device 50.

With further reference to FIGS. 2 and 3, it can be seen that the actuating device 50 can rotate the coupling element 30 from a first position A to a second position B about the axis of rotation X via the connecting means 34, 54 and vice versa. In the assembled state of the locking device 1 shown there, the guide lug 25 of each pawl 20 engages the link guide 35 of the coupling element 30.

In the first position A according to FIG. 2, the guide lug 25 of the pawl 20 is arranged in the first section 36 of the link guide 35. The return spring 27 preloads the pawl 20 in the direction of the ratchet wheel 10. The guide lug 25 rests against the link guide 35 and the pawl 20 is pushed out of the ratchet wheel 10 against the preload of the return spring 27, which is why the ratchet teeth 26 cannot engage the ratchet wheel 10. In this first position A of the coupling element 30, the at least two pawls 20 release a rotation of the ratchet wheel 10 both in the first direction of rotation $\varphi 1$ and in the second direction of rotation $\varphi 2$.

In the second position B according to FIG. 3, the guide lug 25 of each pawl 20 is arranged in the second section 37 of the link guide 35. The guide lug 25 is movable in the second section 37 of the link guide 35 in the radial direction—or around the pivot axis X2—and each pawl 20 can be pressed into the ratchet wheel 10 by a corresponding spring force of the return spring 27 or, when rotated in the first direction of rotation (pi, can be pushed out at the tooth back. In the second position B, only rotation in the first direction of rotation $\varphi 1$ is possible, which is why, in the second position B, freewheeling, for example tightening the parking brake, is possible. It may always be necessary to tighten the parking brake if the components involved in braking cool down after a journey and thermal expansion decreases. A release of the parking brake by turning in the second direction of rotation $\varphi 2$ is blocked.

In particular, it can be seen from FIG. 3 that the at least two pawls 20 are arranged in the direction of rotation about the axis of rotation X in such a way that they are alternately pressed in and out when the ratchet wheel 10 rotates in the first direction of rotation $\varphi 1$. For this purpose, the pawls 20 are not arranged symmetrically to the toothing 12 with respect to the toothing 12 of the ratchet wheel 10, but are arranged offset by half a pitch angle T. This arrangement of the pawls 20 can ensure that in the second position B of the coupling element 30 one of the pawls 20 is always in engagement.

In order to detect the position of the coupling element 30, a magnet 39 can be inserted into the pocket 38, which magnet interacts with a sensor 70, whereby it can be detected whether the coupling element 30 is in the first position A or the second position B. Furthermore, magnets 29 can be inserted into the pockets 28 of the pawls 20. It can be seen from FIGS. 2 and 3 that the magnet 29 is inserted into the pocket 28 of the pawl 20 on the left in the picture in the first end region. On the right in the picture the magnet 29 is inserted into the pocket 28 in the second end region of the pawl. The magnets 29 of the two pawls thus point in the same spatial direction.

The magnets 29 can interact with further sensors 70 to detect whether a pawl 20 is engaging the ratchet wheel 10 or not. The sensors 70 can be Hall sensors, for example, which can detect a change in the magnetic field generated by the corresponding magnet 29, 39.

In order to implement a simple and compact design, it is preferred if the sensors 70 are arranged on one side of the housing. On this side of the housing, the sensors 70 can be arranged on a circuit board or the like. A controller can be provided on this circuit board, the controller being able to control both the actuating device 50 and the data from the sensors 70.

LIST OF REFERENCE NUMERALS

1 Locking device
5 Drive shaft
10 Ratchet wheel
12 Toothing
14 Tooth
20 Pawls
20 Pawl
21 First side
22 Second side
24 Bearing pin
25 Guide lug
26 Ratchet tooth
27 Return spring
28 Pocket
29 Magnet
30 Coupling element
31 First side
32 Second side
33 Notch
34 Connecting means
35 Link guide
36 First section
37 Second section
38 Pocket
39 Magnet
40 Housing
41 Through opening
42 Bearing pin receptacle
44 First recess
46 Second recess
47 Spring mounts
48 Sensor pocket
50 Actuating device
52 Plunger
54 Connecting means
55 Lifting magnet
60 Position securing device
65 Locking bracket
70 Sensor
A First position
B Second position
X Axis of rotation
X2 Pivot axis
τ Pitch angle
φ First direction of rotation
φ2 Second direction of rotation

The invention claimed is:

1. A locking device (1) of a parking brake, comprising:
a ratchet wheel (10), which is movable about an axis of rotation (X) and has toothing (12);
at least two pawls (20) that can engage in the ratchet wheel (10);
an actuating device (50); and
a coupling element (30),
wherein the coupling element (30) couples the at least two pawls (20) to the actuating device (50),
wherein the coupling element (30) is movable by the actuating device (50) into a first position (A), in which the at least two pawls (20) allow rotation of the ratchet wheel (10) in a first direction of rotation and a second direction of rotation, and a second position (B), in which the at least two pawls (20) can engage in the ratchet wheel (10) and allow rotation in only the first direction of rotation,
wherein at least one of the at least two pawls (20) has a guide lug (25) which is arranged at a distance from the axis (X2), that the coupling element (30) has a link guide (35), and that the guide lug (25) engages in the link guide (35),
and wherein the link guide (35) is L-shaped with a first section (36) and a second section (37), and that the first section (36) is directed in the circumferential direction and the second portion (37) in a radial direction.

2. The locking device (1) according to claim 1, characterized in that the at least two pawls (20) are each arranged at different pitch angles (τ) relative to one tooth (14) of the ratchet wheel (10).

3. The locking device (1) according to claim 1, characterized in that in the second position (B), when the ratchet wheel (10) is rotated in the first direction of rotation, the at least two pawls (20) alternately engage in the ratchet wheel (10).

4. The locking device (1) according to claim 1, characterized in that the at least two pawls (20) are arranged circumferentially distributed around the axis of rotation (X).

5. The locking device (1) according to claim 1, characterized in that the at least two pawls (20) can each be pivoted about a pivot axis (X2).

6. The locking device (1) according to claim 1, characterized in that at least one preload is provided by which at least one of the at least two pawls (20) can be pressed against the ratchet wheel (10).

7. The locking device (1) according to claim 1, characterized in that the at least two pawls (20) and the coupling element (30) are coupled by means of the guide lug (25) guided in the link guide (35).

8. The locking device according to claim 1, characterized in that at least one of the at least two pawls (20) has a bearing pin (24) on a first side (21) and has the guide lug (25) or the link guide (35) on the opposite, second side (22).

9. The locking device (1) according to claim 1, characterized in that the coupling element (30) can be rotated about the axis of rotation (X).

10. The locking device (1) according to claim 1, characterized in that the coupling element (30) is ring-shaped.

11. The locking device (1) according to claim 1, characterized in that the actuating device (50) is a linear actuator.

12. The locking device (1) according to claim 11, characterized in that the linear actuator is a lifting magnet (55) with two stable end positions, and/or that the lifting magnet (55) is connected to the coupling element (30) in such a way that the lifting magnet (55) is in one of the stable end positions both in the first position (A) as well as in the second position (B) of the coupling element (30).

13. The locking device (1) according to claim 1, characterized in that at least one sensor (70) is provided, which can detect whether the ratchet wheel (10) is released or not.

14. The locking device (1) according to claim 13, characterized in that the at least one sensor (70) detects the position of the actuating device (50) and/or the position of the coupling element (30).

15. The locking device (1) according to claim 13, characterized in that the at least one sensor (70) detects whether at least one of the at least two pawls (20) is engaging in the ratchet wheel (10).

16. The locking device (1) according to claim 1, characterized in that a housing (40) is provided, and that the at least two pawls (20) and/or the coupling element (30) are mounted on the housing (40).

17. The locking device (1) according to claim 16, characterized in that the housing (40) is a hybrid component made of a metal and a plastic.

18. The locking device (1) according to claim 15, characterized in that the at least one sensor (70) and/or a controller of the actuating device (50) is arranged on the housing (40).

19. A parking brake, having an electric motor which actuates a brake and having a locking device (1) according to claim 1.

20. The parking brake according to claim 19, characterized in that a temperature detection of the brake is provided.

21. The locking device (1) according to claim 1, characterized in that the at least two pawls (20) can each be pivoted about a pivot axis (X2), arranged parallel to the axis of rotation (X).

* * * * *